Patented Oct. 15, 1929

1,731,485

UNITED STATES PATENT OFFICE

WILLIAM C. GEER AND HARRY L. FISHER, OF AKRON, OHIO, ASSIGNORS TO THE B. F. GOODRICH COMPANY, OF NEW YORK, N. Y., A CORPORATION OF NEW YORK

RUBBER COMPOSITION AND METHOD OF PRODUCING THE SAME

No Drawing.   Application filed May 20, 1924. Serial No. 714,734.

This invention relates to compositions made from or containing rubber and its chief object is to provide rubber compositions having low moisture absorption, especially adapting them for marine cable or wire insulations, for example, where moisture absorption undesirably affects the electrical properties of the material. A further object is to provide heat plastic rubber derivatives of pure and uniform character. A still further object is economically to provide heat plastic rubber compositions by reducing the amount of the curing agent required.

In the copending applications of H. L. Fisher, Patent No. 1,668,235, filed January 14, 1924, Patent No. 1,668,236, filed January 17, 1924, and Patent No. 1,668,237, filed April 14, 1924, processes are described for the preparation of balata-like or shellac-like derivatives of rubber, by reacting thereon with a sulfuric acid, a sulfonic acid, a sulfonyl chloride, or mixtures thereof, all of which may be described as reagents having the general formula $R-SO_2-X$ wherein R represents an organic radical or a hydroxy group and X represents chlorine or a hydroxy group. We now find that these reagents react with the resins, proteins and other natural impurities in the raw rubber and thereby transform them into water-soluble products. By washing such balata-like or shellac-like rubber derivatives with hot water on a rubber washing mill or by other suitable means, substantially all of the water absorbing impurities originally present in the crude rubber and all excess of reagents are removed and an improved product is obtained having a lower degree of moisture absorption, such product being better adapted for use in electrical insulation and the like than the unpurified material.

Our invention also comprises the removal of resins, proteins or other impurities from crude rubber and reacting thereon with sulfuric acids, sulfonic acids, sulfonylchlorides, or the like, whereby there is provided an improved class of rubber derivatives substantially free from moisture absorbing constituents. In such processes it is still desirable to wash the reaction product for the removal of further impurities such as excess of reagents.

The purification of the crude rubber as above mentioned may be accomplished, for example, by milling or otherwise forming an emulsion of rubber with such alkaline reagents as sodium carbonate, sodium hydroxide, sodium oleate or the like and heating the mixture in open steam or by boiling in water for from 10 to 36 hours. The modified proteins and resins, and the excess of alkali or other impurities, may then be removed by washing.

In the preparation of gutta percha substitutes as set forth in the copending application of W. C. Geer, Serial No. 708,585, filed April 23, 1924, it was found desirable to modify the plasticity of the reaction products of rubber, such as are hereinbefore mentioned, by milling into them certain percentages of crude rubber. We now find that the water absorption of the mixture may be substantially reduced by (1) preparing the rubber derivatives from purified rubber, by (2) washing the reaction products to remove water soluble impurities and by (3) modifying their physical properties by the addition of purified crude rubber.

Examples of our preferred procedure are as follows:

*Example I.*—A balata-like derivative of rubber is prepared by mixing 100 parts by weight of purified rubber with 5 to 6 parts of phenol sulfonic acid, and the mix is heated in a compact mass in an oven maintained at a temperature of 286° F. for six hours. (The use of unpurified rubber in this example requires from 7 to 7.5 parts of phenol sulfonic acid to produce a product of similar physical properties.) Our final product possesses a higher degree of purity and has a lower moisture absorption, than the product as prepared from unpurified rubber.

We preferably wash the reaction product, as derived from either crude or purified raw rubber, for the further removal of water absorbing impurities.

*Example II.*—A gutta percha substitute is prepared by mixing 180 parts of the balata-like product of Example I with 20 parts of purified rubber, providing a tough, flexible material which can be calendered, tubed, molded or otherwise treated for the preparation of molded insulation or other articles. This product has a lower moisture absorption than the product prepared from crude rubber.

*Example III.*—A shellac-like product is obtained by mixing purified rubber—100, p-toluene sulfonic acid—8, and sulfuric acid (sp. gr. 1.84)—2, parts by weight, and heating the mass for 7½ hours at 190° F. followed by 10 hours at 266° F. This product is more nearly transparent in thin layers, breaks with a conchoidal fracture, grinds easier and is less hygroscopic than the product as prepared from unpurified rubber.

*Example IV.*—An improved gutta percha substitute is prepared by mixing 42.5 parts of a shellac-like rubber derivative, such as described in Example III, with 32.5 parts of a balata-like derivative of rubber, such as described in Example I, and adding thereto 25.0 parts of purified rubber. A gutta percha-like material is thus produced which is much less hygroscopic than the product similarly obtained from unpurified rubber as described in the above identified application of W. C. Geer.

Our invention may be variously modified as to procedure whereby the hygroscopic substances are eliminated, and we do not wholly limit our claims to the exact procedure described.

We claim:—

1. The method of producing a rubber composition having low moisture absorption which comprises effecting a reaction between rubber and a reagent having the general formula $R-SO_2-X$, wherein R represents an organic radical or a hydroxy group and X represents chlorine or a hydroxy group, and, before or after the reaction, removing hygroscopic non-rubber constituents naturally present in crude rubber.

2. The method of producing a rubber composition having low moisture absorption which comprises effecting a reaction between rubber and a reagent having the general formula $R-SO_2-X$, wherein R represents an organic radical or a hydroxy group and X represents chlorine or a hydroxy group, and removing water soluble constituents by washing the reaction product.

3. The method of producing a rubber composition having low moisture absorption which comprises effecting a reaction between rubber and a reagent having the general formula $R-SO_2-X$, wherein R represents an organic radical or a hydroxy group and X represents chlorine or a hydroxy group, and mixing purified raw rubber with the product.

4. The method of producing a rubber composition having low moisture absorption which comprises effecting a reaction between rubber and a reagent having the general formula $R-SO_2-X$, wherein R represents an organic radical or a hydroxy group and X represents chlorine or a hydroxy group, washing the reaction product to remove water soluble impurities and mixing therewith purified raw rubber.

5. The method of producing a rubber composition having low moisture absorption which comprises effecting a reaction between purified raw rubber and a reagent having the general formula $R-SO_2-X$, wherein R represents an organic radical or a hydroxy group and X represents chlorine or a hydroxy group, and mixing purified raw rubber with the product.

6. The method of producing a rubber composition having low moisture absorption which comprises (1) removal of natural impurities present in crude rubber, (2) effecting a reaction between the rubber and a reagent having the general formula $R-SO_2-X$, wherein R represents an organic radical or a hydroxy group and X represents chlorine or a hydroxy group, (3) washing the reaction product to remove water soluble impurities and (4) mixing therewith purified raw rubber.

7. A step in the preparation of rubber compositions having a low moisture absorption and prepared by reacting on rubber with a reagent having the general formula $R-SO_2-X$, wherein R represents an organic radical or a hydroxy group and X represents chlorine or a hydroxy group, which comprises removing hygroscopic, non-rubber constituents naturally present in crude rubber.

8. A composition of matter comprising a reaction product of rubber with a reagent having the general formula $R-SO_2-X$ wherein R represents an organic radical or a hydroxy group and X represents chlorine or a hydroxy group, said composition of matter being relatively free from proteins.

9. A composition of matter comprising a reaction product of rubber with a reagent having the general formula $R-SO_2-X$ wherein R represents an organic radical or a hydroxy group and X represents chlorine or a hydroxy group, said composition being relatively free from the non-rubber constituents naturally present in raw rubber.

10. A composition of matter comprising a reaction product of rubber with a reagent having the general formula $R-SO_2-X$ wherein R represents an organic radical or a hydroxy group and X represents chlorine or a hydroxy group, said composition of matter being relatively free from hygroscopic constituents.

11. A composition of matter comprising a reaction product of rubber with a sulfonic acid, said composition being relatively free from proteins.

12. A composition of matter comprising a reaction product of rubber with a sulfonic acid, said composition being relatively free from the non-rubber constituents naturally present in raw rubber.

13. A composition of matter comprising a reaction product of rubber with a sulfonic acid, said composition being relatively free from hygroscopic constituents.

14. A composition of matter comprising a reaction product of rubber with p-toluene sulfonic acid, said composition being relatively free from proteins.

15. A composition of matter comprising a reaction product of rubber with p-toluene sulfonic acid, said composition being relatively free from the non-rubber constituents naturally present in raw rubber.

16. A composition of matter comprising a reaction product of rubber with p-toluene sulfonic acid, said composition being relatively free from hygroscopic constituents.

In witness whereof we have hereunto set our hands this 17th day of May, 1924.

WILLIAM C. GEER.
HARRY L. FISHER.